US012378890B2

(12) United States Patent
Sibbach (10) Patent No.: US 12,378,890 B2
(45) Date of Patent: Aug. 5, 2025

(54) TURBINE ENGINE INCLUDING A GAS PATH COMPONENT HAVING A HYDROPHOBIC COATING

(71) Applicant: General Electric Company, Schenectady, NY (US)

(72) Inventor: Arthur W. Sibbach, Boxford, MA (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/468,189

(22) Filed: Sep. 15, 2023

(65) Prior Publication Data

US 2025/0092792 A1 Mar. 20, 2025

(51) Int. Cl.
*F01D 5/28* (2006.01)
*F01D 9/04* (2006.01)
(Continued)

(52) U.S. Cl.
CPC .............. *F01D 5/288* (2013.01); *F01D 9/041* (2013.01); *F01D 25/005* (2013.01); *F02C 3/30* (2013.01);
(Continued)

(58) Field of Classification Search
CPC ................................................. F05D 2300/512
See application file for complete search history.

(56) References Cited

U.S. PATENT DOCUMENTS

| 4,592,204 A | 6/1986 | Rice |
| 5,896,740 A | 4/1999 | Shouman |

(Continued)

FOREIGN PATENT DOCUMENTS

| FR | 3127269 A1 | 3/2023 |
| FR | 3130896 A1 | 6/2023 |

(Continued)

OTHER PUBLICATIONS

Bjorn Fehrm, Leeham News and Analysis, "MTU gets support from Pratt & Whitney to develop the WET engine," published Nov. 29, 2022, available at https://leehamnews.com/2022/11/29/mtu-gets-support-from-pratt-whitney-to-develop-the-wet-engine/, as viewed on Jun. 30, 2023.

(Continued)

*Primary Examiner* — Scott J Walthour
(74) *Attorney, Agent, or Firm* — Venable LLP; David D. Leege; Michele V. Frank (57) ABSTRACT

A turbine engine for an aircraft. The turbine engine includes a core turbine engine and a steam system. The steam system extracts water from combustion gases, vaporizes the water to generate steam, and injects the steam into a core air flow path of the core engine to add mass flow to core air. A core hot gas path component may be fluidly connected to a hot gas path that routes combustion gasses from the combustor. The core turbine engine may also include a turbine fluidly connected to the hot gas path to receive the combustion gases. The turbine may include a turbine airfoil. Each of the core hot gas path component and the turbine airfoil includes a combustion-gas-facing surface facing the hot gas path. A hydrophobic coating is formed on the combustion-gas-facing surface, reducing wetting of water vapor within the combustion gases on the core hot gas path component.

18 Claims, 4 Drawing Sheets

(51) Int. Cl.
*F01D 25/00* (2006.01)
*F02C 3/30* (2006.01)

(52) U.S. Cl.
CPC .... *F05D 2220/323* (2013.01); *F05D 2240/12* (2013.01); *F05D 2240/30* (2013.01); *F05D 2300/512* (2013.01)

(56) References Cited

U.S. PATENT DOCUMENTS

| | | | |
|---|---|---|---|
| 7,527,832 B2 | 5/2009 | Sakoske et al. | |
| 7,914,856 B2 | 3/2011 | Deng et al. | |
| 7,977,267 B2 | 7/2011 | Gentleman et al. | |
| 8,062,775 B2 | 11/2011 | Gentleman et al. | |
| 8,178,219 B2 | 5/2012 | Gentleman et al. | |
| 8,222,172 B2 | 7/2012 | Gentleman et al. | |
| 8,497,029 B2 | 7/2013 | Gentleman et al. | |
| 11,603,798 B1 | 3/2023 | Terwilliger et al. | |
| 2010/0151264 A1* | 6/2010 | Gentleman | C23C 30/00 136/256 |
| 2014/0113144 A1 | 4/2014 | Loth et al. | |
| 2016/0025003 A1* | 1/2016 | Schwarz | F02K 3/06 415/69 |
| 2018/0230912 A1 | 8/2018 | Hasel et al. | |
| 2020/0141246 A1* | 5/2020 | Hafner | F01D 5/147 |
| 2021/0207500 A1 | 7/2021 | Klingels et al. | |
| 2021/0348566 A1* | 11/2021 | Nowakowski | F02C 7/36 |
| 2022/0371967 A1* | 11/2022 | Li | C04B 41/87 |
| 2023/0150678 A1* | 5/2023 | Klingels | B64D 33/04 244/55 |

FOREIGN PATENT DOCUMENTS

| | | |
|---|---|---|
| FR | 3130897 A1 | 6/2023 |
| FR | 3133367 A1 | 9/2023 |
| FR | 3133368 A1 | 9/2023 |

OTHER PUBLICATIONS

MTU Aero Engines, "Water-enhanced turbofan," available at https://www.mtu.de/technologies/clean-air-engine/water-enhanced-turbofan/, as viewed on Jun. 30, 2023.

Isabel Henrich, MTU Aero Engines, "A brief guide: How the WET concept works," published Jun. 2022, available at https://aeroreport.de/en/good-to-know/a-brief-guide-how-the-wet-concept-works, as viewed on Jun. 30, 2023.

Slides from Sustainable Water-Injecting Turbofan Comprising Hybrid-Electrics (SWITCH) Introduction at the 2023 NPSS Annual Consortium Meeting, Mar. 10, 2023.

"Steam Turbine Calculator" [accessed on Dec. 3, 2024 at https://invenoeng.com/wp-content/uploads/2017/07/2018-PRV-and-Steam-Turbine-Calculator-Rev-3.xlsm]. (Year: 2017).

Jane's Aero-Engines, Issue Seven, Edited by Bill Gunston, Jane's Information Group Inc., Alexandria, Virginia, 2000, pp. 1-67. (Year: 2000).

Pratt & Whitney PW1000G webpage accessed at https://en.wikipedia.org/wiki/Pratt_%26_Whitney_PW1000G on Aug. 13, 2024, pp. 1-16. (Year: 2024).

\* cited by examiner

TURBINE ENGINE INCLUDING A GAS PATH COMPONENT HAVING A HYDROPHOBIC COATING

TECHNICAL FIELD

The present disclosure relates generally to turbine engines, particularly turbine engines for aircraft.

BACKGROUND

Turbine engines used in aircraft generally include a fan and a core section arranged in flow communication with one another. A combustor is arranged in the core section to generate combustion gases for driving a turbine in the core section of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, the following detailed description is exemplary and intended to provide explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. The terms "forward" and "aft" refer to relative positions within a turbine engine or a vehicle, and refer to the normal operational attitude of the turbine engine or the vehicle. For example, with regard to a turbine engine, forward refers to a position closer to an engine inlet and aft refers to a position closer to an engine nozzle or an exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, a "bypass ratio" of a turbine engine is a ratio of bypass air through a bypass of the turbine engine to core air through a core inlet of a core turbine engine of the turbine engine. For example, the bypass ratio is a ratio of bypass air 62 entering the bypass airflow passage 56 to core air 64 entering the core turbine engine 16.

As used herein, a "compression ratio" of a compressor is a ratio of a compressor exit pressure at an exit of the compressor to a compressor inlet pressure at an inlet of the compressor. The compressor exit pressure and the compressor inlet pressure are measured as static air pressures perpendicular to the direction of the core air flow through the compressor.

As used herein, a "pressure expansion ratio" of a turbine is a ratio of a pressure at an inlet of the turbine to a pressure at an exit of the turbine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

As noted above, a combustor is arranged in the core section to generate combustion gases for driving a turbine in the core section of the turbine engine. Not all of the energy and heat generated by the combustor is used to drive the turbine(s) of the turbine section. Instead, some of the waste heat is exhausted through a jet exhaust nozzle section in a conventional turbine engine. The turbine engine discussed herein includes a steam system that is used to recover some of the energy from the waste heat by generating steam and driving a steam turbine. After flowing through the steam turbine, the steam may be injected into the combustor. Water from the steam thus flows through a hot gas path downstream of the combustor and comes into contact with various hot gas path components, such hot gas path components include, for example, turbine blades, vanes, shrouds, frames, or any other structure in contact with the combustion gases. With the steam in the combustion gases, these components are exposed to water leading to potential corrosion concerns and icing concerns, such as when the engine is shut down overnight in sub-freezing conditions. To minimize the impact of water on these components, the hot gas path components discussed herein include a hydrophobic coating applied to an outer surface thereof. As these hot gas path components are exposed to relatively high temperatures (e.g., temperatures from one thousand five hundred degrees Fahrenheit (1500° F.) (eight hundred fifteen degrees Celsius (815° C.) to three thousand six hundred degrees Fahrenheit (3600° F.) (one thousand nine hundred eighty-two degrees Celsius (1982° C.))), the hot gas path components may also have a thermal barrier coating applied to the outer surface, and, thus, the hot gas path components discussed herein may include both a hydrophobic coating applied as an outer layer to the substrate of a hot gas path component and a thermal barrier coating applied as an intermediate layer between the hydrophobic coating and the substrate of a hot gas path component.

Figure 1:
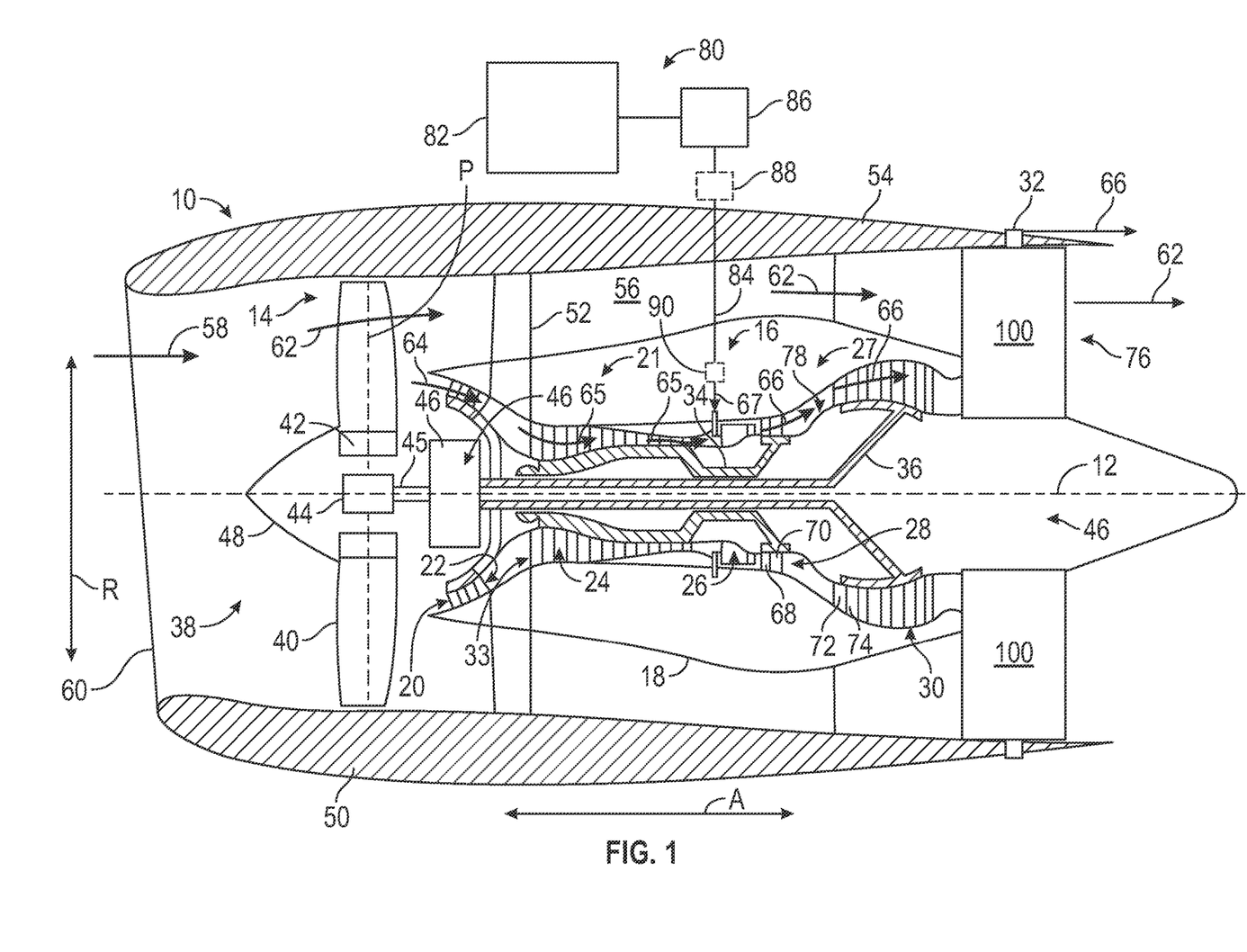
FIG. 1 is a schematic cross-sectional diagram of a turbine engine including a steam system, taken along a longitudinal centerline axis of the turbine engine, according to the present disclosure.

Referring now to the drawings, FIG. 1 is a schematic cross-sectional diagram of a turbine engine 10 including a steam system 100, taken along a longitudinal centerline axis 12 (provided for reference) of the turbine engine 10, according to an embodiment of the present disclosure. As shown in FIG. 1, the turbine engine 10 has an axial direction A (extending parallel to the longitudinal centerline axis 12) and a radial direction R that is normal to the axial direction A. In general, the turbine engine 10 includes a fan section 14 and a core turbine engine 16 disposed downstream from the fan section 14.

The core turbine engine 16 includes an outer casing 18 that is substantially tubular and defines an annular core inlet 20. As schematically shown in FIG. 1, the outer casing 18 encases, in serial flow relationship, a compressor section 21 including a booster or a low-pressure compressor (LPC) 22 followed downstream by a high-pressure compressor (HPC) 24, a combustor 26, a turbine section 27, including a high-pressure turbine (HPT) 28, followed downstream by a low-pressure turbine (LPT) 30, and one or more core exhaust nozzles 32. A high-pressure (HP) shaft 34 or a spool drivingly connects the HPT 28 to the HPC 24 to rotate the HPT 28 and the HPC 24 in unison. The HPT 28 is drivingly coupled to the HP shaft 34 to rotate the HP shaft 34 when the HPT 28 rotates. A low-pressure (LP) shaft 36 drivingly connects the LPT 30 to the LPC 22 to rotate the LPT 30 and the LPC 22 in unison. The LPT 30 is drivingly coupled to the LP shaft 36 to rotate the LP shaft 36 when the LPT 30 rotates. The compressor section 21, the combustor 26, the turbine section 27, and the one or more core exhaust nozzles 32 together define a core air flow path 33.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween. The one or more core exhaust nozzles 32 may extend through the nacelle 50 and be formed therein. In this embodiment, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50.

During operation of the turbine engine 10, a volume of air 58 enters the turbine engine 10 through an inlet 60 of the nacelle 50 and/or the fan section 14. As the volume of air 58 passes across the fan blades 40, a first portion of air (bypass air 62) is directed or routed into the bypass airflow passage 56, and a second portion of air (core air 64) is directed or is routed into the upstream section of the core air flow path 33, or, more specifically, into the core inlet 20. The ratio between the first portion of air (bypass air 62) and the second portion of air (core air 64) is known as a bypass ratio. In some embodiments, the bypass ratio is greater than 18:1, enabled by a steam system 100, detailed further below. The pressure of the core air 64 is then increased by the LPC 22, generating compressed air 65, and the compressed air 65 is routed through the HPC 24 and further compressed before being directed into the combustor 26, where the compressed air 65 is mixed with fuel 67 and burned to generate combustion gases 66 (combustion products). One or more stages may be used in each of the LPC 22 and the HPC 24, with each subsequent stage further compressing the compressed air 65. The HPC 24 has a compression ratio greater than 20:1, preferably, in a range of 20:1 to 40:1. The compression ratio is a ratio of a pressure of a last stage of the HPC 24 to a pressure of a first stage of the HPC 24. The compression ratio greater than 20:1 is enabled by the steam system 100, as detailed further below.

The combustion gases 66 are routed into the HPT 28 and expanded through the HPT 28 where a portion of thermal energy and/or kinetic energy from the combustion gases 66 is extracted via sequential stages of HPT stator vanes 68 that are coupled to the outer casing 18 and a plurality of HPT rotor blades 70 that are coupled to the HP shaft 34, thus, causing the HP shaft 34 to rotate, thereby supporting operation of the HPC 24. The combustion gases 66 are then routed into the LPT 30 and expanded through the LPT 30. Here, a second portion of thermal energy and/or the kinetic energy is extracted from the combustion gases 66 via sequential stages of LPT stator vanes 72 that are coupled to the outer casing 18 and a plurality of LPT rotor blades 74 that are coupled to the LP shaft 36, thus, causing the LP shaft 36 to rotate, thereby supporting operation of the LPC 22 and rotation of the fan 38 via the gearbox assembly 46. One or more stages may be used in each of the HPT 28 and the LPT 30. The HPC 24 having a compression ratio in a range of 20:1 to 40:1 results in the HPT 28 having a pressure expansion ratio in a range of 1.5:1 to 4:1 and the LPT 30 having a pressure expansion ratio in a range of 4.5:1 to 28:1.

The combustion gases 66 are subsequently routed through the one or more core exhaust nozzles 32 of the core turbine engine 16 to provide propulsive thrust. Simultaneously with the flow of the core air 64 through the core air flow path 33, the bypass air 62 is routed through the bypass airflow passage 56 before being exhausted from a fan bypass nozzle 76 of the turbine engine 10, also providing propulsive thrust. The combustor 26, the HPT 28, the LPT 30, and the one or more core exhaust nozzles 32 at least partially define a hot gas path 78 for routing the combustion gases 66 through the core turbine engine 16.

As noted above, the compressed air 65 (i.e., the core air 64) is mixed with the fuel 67 in the combustor 26 to generate a fuel and air mixture, and combusted, generating combustion gases 66 (i.e., combustion products). The fuel 67 can include any type of fuel used for turbine engines, such as, for example, sustainable aviation fuels (SAF) including biofuels, JetA, or other hydrocarbon fuels. The fuel 67 also may be a hydrogen-based fuel ($H_2$), and, while hydrogen-based fuel may include blends with hydrocarbon fuels, the fuel 67 used herein is preferably unblended, and referred to herein as hydrogen fuel. In some embodiments, the hydrogen fuel may comprise substantially pure hydrogen molecules (i.e., diatomic hydrogen). The fuel 67 may also be a cryogenic fuel. For example, when the hydrogen fuel is used the hydrogen fuel may be stored in a liquid phase at cryogenic temperatures.

The turbine engine 10 includes a fuel system 80 for providing the fuel 67 to the combustor 26. The fuel system 80 includes a fuel tank 82 for storing the fuel 67 therein, and a fuel delivery assembly 84. The fuel tank 82 can be located on an aircraft (not shown) to which the turbine engine 10 is attached. While a single fuel tank 82 is shown in FIG. 1, the fuel system 80 can include any number of fuel tanks 82, as desired. The fuel delivery assembly 84 delivers the fuel 67 from the fuel tank 82 to the combustor 26. The fuel delivery assembly 84 includes one or more lines, conduits, pipes, tubes, etc., configured to carry the fuel 67 from the fuel tank 82 to the combustor 26. The fuel delivery assembly 84 also includes a pump 86 to induce the flow of the fuel 67 through the fuel delivery assembly 84 to the combustor 26. In this way, the pump 86 pumps the fuel 67 from the fuel tank 82, through the fuel delivery assembly 84, and into the combustor 26. The fuel system 80 and, more specifically, the fuel tank 82 and the fuel delivery assembly 84, either collectively or individually, may be a fuel source for the combustor 26.

In some embodiments, for example, when the fuel 67 is a hydrogen fuel, the fuel system 80 includes one or more vaporizers 88 (illustrated by dashed lines) and a metering valve 90 (illustrated by dashed lines) in fluid communication with the fuel delivery assembly 84. In this example, the hydrogen fuel is stored in the fuel tank 82 as liquid hydrogen fuel. The one or more vaporizers 88 heat the liquid hydrogen fuel flowing through the fuel delivery assembly 84. The one or more vaporizers 88 are positioned in the flow path of the fuel 67 between the fuel tank 82 and the combustor 26, and are located downstream of the pump 86. The one or more vaporizers 88 are in thermal communication with at least one heat source, such as, for example, waste heat from the turbine engine 10 and/or from one or more systems of the aircraft (not shown). The one or more vaporizers 88 heat the liquid hydrogen fuel and the liquid hydrogen fuel is converted into a gaseous hydrogen fuel within the one or more vaporizers 88. The fuel delivery assembly 84 directs the gaseous hydrogen fuel into the combustor 26.

The metering valve 90 is positioned downstream of the one or move vaporizers 88 and the pump 86. The metering valve 90 receives hydrogen fuel in a substantially completely gaseous phase, or in a substantially completely supercritical phase. The metering valve 90 provides the flow of fuel to the combustor 26 in a desired manner. More specifically, the metering valve 90 provides a desired volume of hydrogen fuel at, for example, a desired flow rate, to a fuel manifold that includes one or more fuel injectors that inject the hydrogen fuel into the combustor 26. The fuel system 80 can include any components for supplying the fuel 67 from the fuel tank 82 to the combustor 26, as desired.

The turbine engine 10 includes the steam system 100 in fluid communication with the one or more core exhaust nozzles 32 and the fan bypass nozzle 76. The steam system 100 extracts steam from the combustion gases 66 as the combustion gases 66 flow through the steam system 100, as detailed further below.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, and/or turboprop engines.

Figure 2:
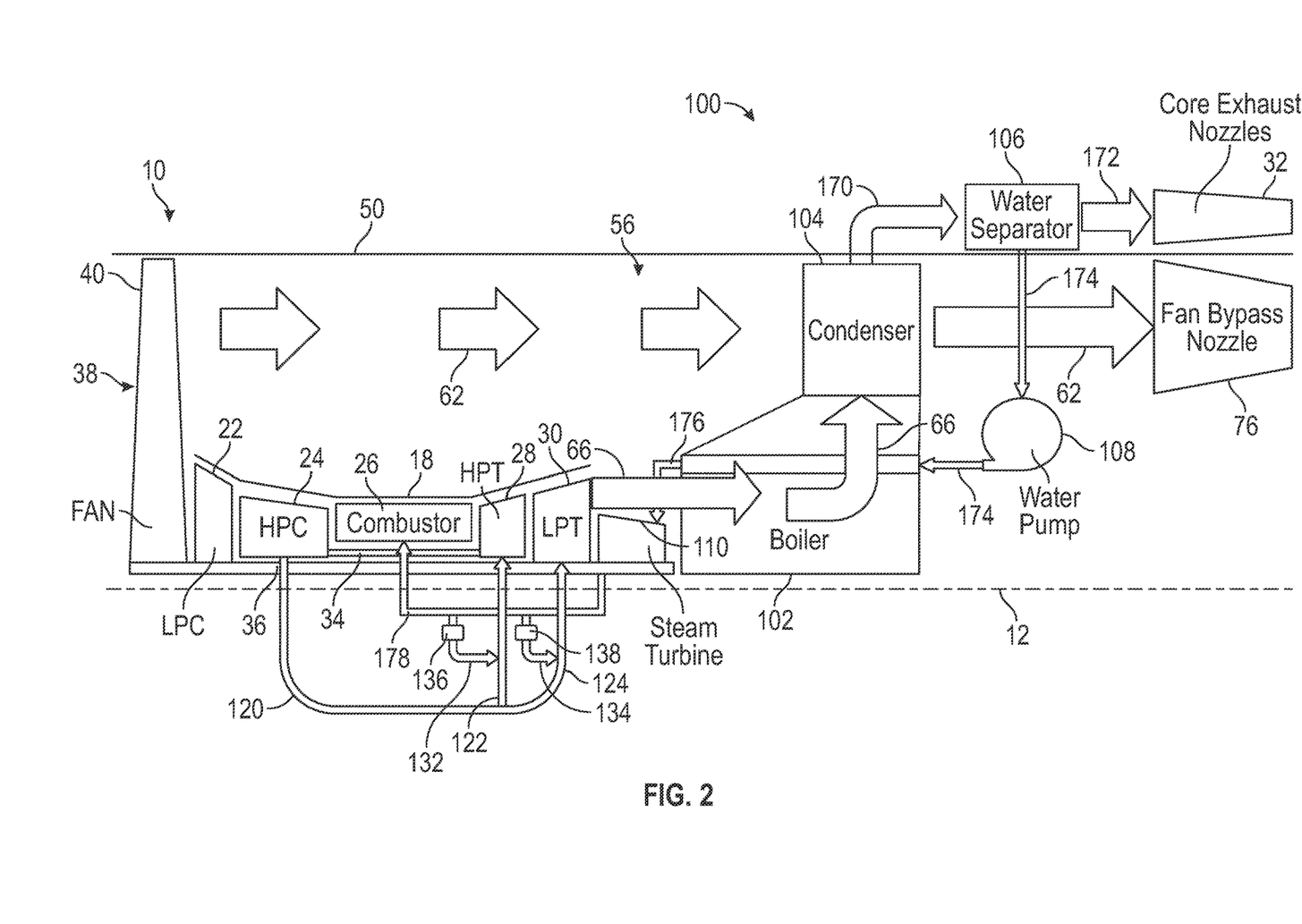
FIG. 2 is a schematic diagram of the turbine engine and a steam system according to an embodiment of the present disclosure.

FIG. 2 is a schematic diagram of the turbine engine 10 having a steam system, according to an embodiment of the present disclosure. The steam system 100 may be used as the steam system 100 in the turbine engine 10 shown in FIG. 1. For clarity, various features of the turbine engine 10 described and shown above are shown schematically in FIG. 2 and some components are not shown in FIG. 2, but the description of such components also applies here. The steam system 100 includes a boiler 102, a condenser 104, a water separator 106, a water pump 108, and a steam turbine 110.

The boiler 102 is a heat exchanger that vaporizes liquid water from a water source to generate steam or water vapor, as detailed further below. The boiler 102 is thus a steam source. In particular, the boiler 102 is an exhaust gas-water heat exchanger. The boiler 102 is in fluid communication with the hot gas path 78 (FIG. 1) and is positioned downstream of the LPT 30. The boiler 102 is also in fluid communication with the water pump 108, as detailed further below. The boiler 102 can include any type of boiler or heat exchanger for extracting heat from the combustion gases 66 and vaporizing liquid water into steam or water vapor as the liquid water and the combustion gases 66 flow through the boiler 102.

The condenser 104 is a heat exchanger that further cools the combustion gases 66 as the combustion gases 66 flow through the condenser 104, as detailed further below. In particular, the condenser 104 is an air-exhaust gas heat exchanger. The condenser 104 is in fluid communication with the boiler 102 and, in this embodiment, is positioned within the bypass airflow passage 56. The condenser 104, however, may be positioned elsewhere and thermally connected to other cooling sources, such as being thermally connected to the fuel 67 to transfer heat to the fuel 67, particularly, when the fuel 67 is a cryogenic fuel such as hydrogen fuel. The condenser 104 can include any type of condenser for condensing water from the exhaust (e.g., the combustion gases 66).

The water separator 106 is in fluid communication with the condenser 104 for receiving cooled exhaust (combustion gases 66) having condensed water entrained therein. The water separator 106 is also in fluid communication with the one or more core exhaust nozzles 32 and with the water pump 108. The water separator 106 includes any type of water separator for separating water from the exhaust. For example, the water separator 106 can include a cyclonic separator that uses vortex separation to separate the water from the air. In such embodiments, the water separator 106 generates a cyclonic flow within the water separator 106 to separate the water from the cooled exhaust. In FIG. 2, the water separator 106 is schematically depicted as being in the nacelle 50, but the water separator 106 could be located at other locations within the turbine engine 10, such as, for example, radially inward of the nacelle 50, closer to the core turbine engine 16. The water separator 106 may be driven to rotate by one of the core shafts, such as the HP shaft 34 or the LP shaft 36. As noted above, the boiler 102 receives liquid water from a water source to generate steam or water vapor. In the embodiment depicted in FIG. 2, the condenser 104 and the water separator 106, individually or collectively, are the water source for the boiler 102.

The water pump 108 is in fluid communication with the water separator 106 and with the boiler 102. The water pump 108 is in fluid communication with the condenser 104 via the water separator 106. The water pump 108 may be any suitable pump, such as a centrifugal pump or a positive displacement pump. The water pump 108 directs the separated liquid water through the boiler 102 where it is converted back to steam. This steam is sent through the steam turbine 110 then injected into core air flow path 33, such as into the combustor 26.

In operation, the combustion gases 66, also referred to as exhaust, flow from the LPT 30 into the boiler 102. The combustion gases 66 transfer heat into the water 174 (e.g., in liquid form) within the boiler 102, as detailed further below. The combustion gases 66 then flow into the condenser 104. The condenser 104 condenses the water 174 (e.g., in liquid form) from the combustion gases 66. The bypass air 62 flows through the bypass airflow passage 56 and over or through the condenser 104 and extracts heat from the combustion gases 66, cooling the combustion gases 66 and condensing the water 174 from the combustion gases 66, to generate an exhaust-water mixture 170. The bypass air 62 is then exhausted out of the turbine engine 10 through the fan bypass nozzle 76 to generate thrust, as detailed above. The condenser 104 thus may be positioned in bypass airflow passage 56.

The exhaust-water mixture 170 flows into the water separator 106. The water separator 106 separates the water 174 from the exhaust of the exhaust-water mixture 170 to generate separate exhaust 172 and the water 174. The exhaust 172 is exhausted out of the turbine engine 10 through the one or more core exhaust nozzles 32 to generate thrust, as detailed above. The boiler 102, the condenser 104, and the water separator 106 thus also define a portion of the hot gas path 78 (see FIG. 1) for routing the combustion gases 66, the exhaust-water mixture 170, and the exhaust 172 through the steam system 100 of the turbine engine 10.

The water pump 108 pumps the water 174 (e.g., in liquid form) through one or more water lines (as indicated by the arrow for the water 174 in FIG. 2) and the water 174 flows through the boiler 102. As the water 174 flows through the boiler 102, the combustion gases 66 flowing through the boiler 102 transfer heat into the water 174 to vaporize the water 174 and to generate the steam 176 (e.g., vapor). The steam turbine 110 includes one or more stages of steam turbine blades (not shown) and steam turbine stators (not shown). The steam 176 flows from the boiler 102 into the steam turbine 110, through one or more steam lines (as indicated by the arrow for the steam 176 in FIG. 2), causing the steam turbine blades of the steam turbine 110 to rotate, thereby generating additional work in an output shaft (e.g., one of the core shafts) connected to the turbine blades of the steam turbine 110.

As noted above, the core turbine engine 16 includes shafts, also referred to as core shafts, coupling various rotating components of the core turbine engine 16 and other thrust producing components such as the fan 38. In the core turbine engine 16 shown in FIG. 1, these core shafts include the HP shaft 34 and the LP shaft 36. The steam turbine 110 is coupled to one of the core shafts of the core turbine engine 16, such as the HP shaft 34 or the LP shaft 36. In the illustrated embodiment, the steam turbine 110 is coupled to the LP shaft 36. As the steam 176 flows from the boiler 102 through the steam turbine 110, the kinetic energy of this gas is converted by the steam turbine 110 into mechanical work in the LP shaft 36. The reduced temperature steam (as steam 178) exiting the steam turbine 110 is then injected into the core air flow path 33, such as into the combustor 26, upstream of the combustor 26, or downstream of the combustor 26. The steam 178 flows through one or more steam lines from the steam turbine 110 to the core air flow path 33. The steam 178 injected into the core air flow path 33 adds mass flow to the core air 64 such that less core air 64 is needed to produce the same amount of work through the turbine section 27. In this way, the steam system 100 extracts additional work from the heat in exhaust gas that would otherwise be wasted. The steam 178 injected into the core air flow path 33 is in a range of 20% to 50% of the mass flow through the core air flow path 33.

The steam turbine 110 may have a pressure expansion ratio in a range of 2:1 to 6:1. The pressure expansion ratio is a ratio of the pressure at an inlet of the steam turbine 110 to the pressure at an exit of the steam turbine 110. The steam turbine 110 may contribute approximately 25% of the power to the LP shaft 36 (or to the HP shaft 34) when the steam system 100 recovers approximately 70% of the water 174 and converts the water 174 into the steam 176. The steam turbine 110 has a pressure expansion ratio in a range of 2:1 to 6:1, the LPT 30 has a pressure expansion ratio in a range of 4.5:1 to 28:1, and the steam 178 contributes to 20% to 50% of the mass flow through the core air flow path 33. The steam turbine 110 expands the steam 176, thereby reducing the energy of the steam 178 exiting the steam turbine 110 and reducing the temperature of the steam 178 to approximately a temperature of the compressed air 65 (see FIG. 1) that is discharged from the HPC 24. Such a configuration enables the steam 178 to reduce hot spots in the combustor 26 from the combustion of the fuel (e.g., in particular when the fuel is supercritical hydrogen or gaseous hydrogen).

The steam 178 injected into the core air flow path 33 also enables the HPT 28 to have a greater energy output with fewer stages of the HPT 28 as compared to HPTs without the benefit of the present disclosure. For example, the additional mass flow from the steam 178 through the turbine section 27 helps to produce a greater energy output. In this way, HPT 28 may only have one stage capable sustainably driving a higher number of stages of the HPC 24 (e.g., 10, 11, or 12 stages of the HPC 24) due to the higher mass flow (resulting from the steam injection) exiting the combustor 26. The steam 178 that is injected into the core air flow path 33 enables the HPT 28 to have only one stage that drives the plurality of stages of the HPC 24 without reducing an amount of work that the HPT 28 produces as compared to HPTs without the benefit of the present disclosure, while also reducing a weight of the HPT 28 and increasing an efficiency of the HPT 28, as compared to HPTs without the benefit of the present disclosure.

With less core air 64 (see FIG. 1) needed due to the added mass flow from the steam 176, the compression ratio of the HPC 24 may be increased as compared to HPCs without the benefit of the present disclosure. In this way, the HPC 24 has a compression ratio greater than 20:1. In some embodiments, the compression ratio of the HPC 24 is in a range of 20:1 to 40:1. Thus, the compression ratio of the HPC 24 is increased, thereby increasing the thermal efficiency of the turbine engine 10 as compared to HPCs and turbine engines without the benefit of the present disclosure. Further, the HPC 24 may have a reduced throat area due to the added mass flow in the core turbine engine 16 provided by the steam 176, 178 injected into the core turbine engine 16. Accordingly, the HPC 24 has a reduced size (e.g., outer diameter) and a reduced weight, as compared to turbine engines without the benefit of the present disclosure.

In some embodiments, the HPC stator vanes of at least two stages of the HPC 24 are variable stator vanes that are controlled to be pitched about a pitch axis to vary a pitch of the HPC stator vanes. In some embodiments, the HPC 24 includes one or more compressor bleed valves that are controlled to be opened to bleed a portion of the compressed air 65 (see FIG. 1) from the HPC 24. The one or more compressor bleed valves are preferably positioned between a fourth stage of the HPC 24 and a last stage of the HPC 24. The HPC stator vanes that are variable stator vanes, and the one or more compressor bleed valves help to balance the air flow (e.g., the compressed air 65) through all stages of the HPC 24. Such a balance, in combination with the steam 178 injected into the core air flow path 33, enables the number of stages of the HPC 24 to include ten to twelve stages for compression ratios to be greater than 20:1, and preferably in a range of 20:1 to 40:1.

The additional work that is extracted by the steam system 100 and the steam 178 injected into the core air flow path 33 enables a size of the core turbine engine 16 (FIG. 1) to be reduced, thereby increasing the bypass ratio of the turbine engine 10, as compared to turbine engines without the benefit of the present disclosure. In this way, the turbine engine 10 has a bypass ratio greater than 18:1, preferably, in a range of 18:1 to 100:1, more preferably, in a range of 25:1 to 85:1, and, most preferably, in a range of 28:1 to 70:1. In this way, the steam system 100 can enable an increased bypass ratio in which the turbine engine 10 can move a larger mass of air through the bypass, reducing the pressure ratio of the fan 38 and increasing the efficiency of the turbine engine 10 as compared to turbine engines without the benefit of the present disclosure.

As noted above in FIG. 1, the fuel 67 is combusted in the combustor 26 and, more specifically, a combustion chamber (not shown) of the combustor 26, generating the combustion gases 66. The combustion chamber may be defined by a combustion liner having an inner surface. Combustion occurs at high temperatures, such as from two thousand degrees Fahrenheit (2000° F.) (one thousand ninety-three degrees Celsius (1093° C.) to three thousand six hundred degrees Fahrenheit (3600° F.) (one thousand nine hundred eighty-two degrees Celsius (1982° C.))), and thus these combustion gases 66 are also at similar high temperatures. Reactive fuels, such as the hydrogen fuel discussed herein, combust at the high end of this range. The components within the hot gas path 78 that are directly exposed to the combustion gases 66 are referred to as hot gas path components. The hot gas path components may include core hot gas path components and steam hot gas path components. As used herein, those components of the hot gas path 78 within the core turbine engine 16 are referred to as core hot gas path components 200 (see FIG. 3), distinguishing them from other components, such as those of the steam system 100, that are within the hot gas path 78 but are downstream from the core turbine engine 16. Non-limiting examples of the core hot gas path components 200 include the combustion liner, the HPT stator vanes 68, the HPT rotor blades 70, the LPT stator vanes 72, and the LPT rotor blades 74. Other non-limiting examples of the core hot gas path components 200 include shrouds, frames, or any other structure in contact with the combustion gases 66 within the hot gas path 78 within the combustor 26, the HPT 28, or the LPT 30.

The components of the turbine engine 10 that are directly exposed to these combustion gases 66 may be actively cooled. A cooling fluid, such as cooling air, may be provided to the hot gas path components and, more specifically, the core hot gas path components 200 (see FIG. 3). This cooling air may be provided from a cooling fluid source (or cooling air source). Suitable cooling air sources include a portion of the air 58 provided to the fan 38 and subsequently directed through the turbine engine 10. While the cooling air may be bypass air 62, the cooling air preferably is core air 64 in this embodiment and, more preferably, a portion of the compressed air 65 flowing through the LPC 22 or HPC 24, which is referred to herein as compressor cooling air 120. In the embodiment shown in FIG. 2, the compressor cooling air 120 is drawn from the HPC 24 and flows through a flow path, such as a duct, indicated by the arrow 120.

The compressor cooling air 120 is then directed into various components of the hot gas path 78 (see FIG. 1) including, for example, the HPT 28 and the LPT 30. In this embodiment, a portion of the compressor cooling air 120 is HPT cooling air 122 directed into the HPT 28 to cool components of the HPT 28, such as the HPT stator vanes 68 (see FIG. 1) and the HPT rotor blades 70 (see FIG. 1), for example (as will be discussed further below). Another portion of the compressor cooling air 120 is LPT cooling air 124 directed into the LPT 30 to cool components of the LPT 30, such as the LPT stator vanes 72 (see FIG. 1) and the LPT rotor blades 74 (see FIG. 1).

Figure 3:
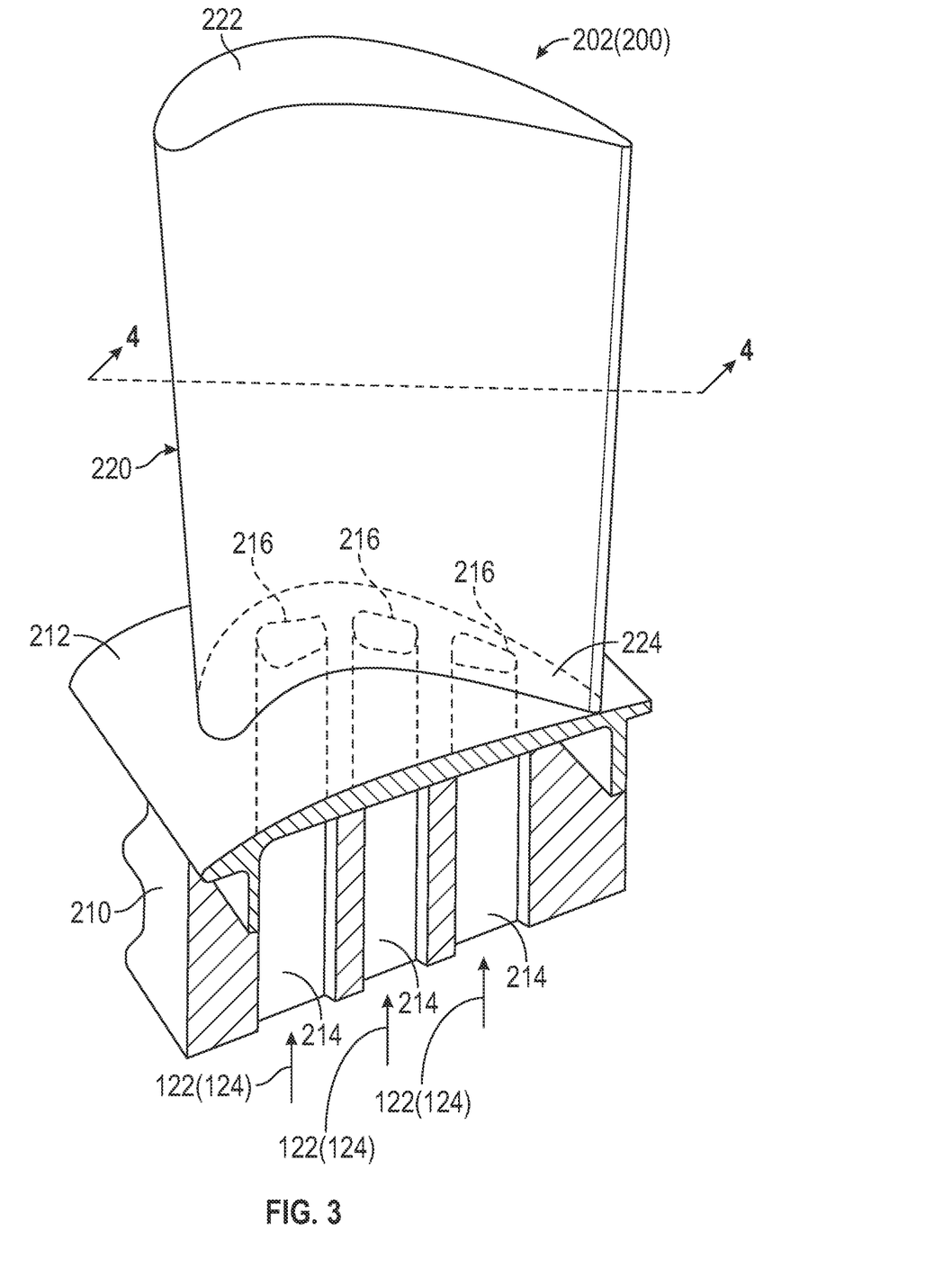
FIG. 3 is a partial cross-sectional elevational view of a hot gas path engine component in the form of a turbine blade of the engine of FIG. 1 with cooling air inlet passages.

Water has a high heat capacity and may be used to help to cool the core hot gas path components 200 (see FIG. 3). In the embodiments discussed herein, a portion of the steam 178 may be directed into and mixed with the compressor cooling air 120 and provided with the compressor cooling air 120 to enhance the cooling effect of the compressor cooling air 120. For example, a first portion of the steam 178 (i.e., HPT cooling steam 132) is directed from the steam 178 and mixed with the HPT cooling air 122 to help to cool the components of the HPT 28. Similarly, a second portion of the steam 178 (i.e., LPT cooling steam 134) is directed from the steam 178 and mixed with LPT cooling air 124 to help to cool the components of the LPT 30. The flow of the HPT cooling steam 132 and the LPT cooling steam 134 into the HPT cooling air 122 and the LPT cooling air 124, respectively, may be controlled by a flow control valve. More specifically, an HPT cooling steam control valve 136 is positioned in the flow path of the HPT cooling steam 132 to control the flow of the HPT cooling steam 132 into the HPT cooling air 122. Similarly, an LPT cooling steam control valve 138 is positioned in the flow path of the LPT cooling steam 134 to control the flow of the LPT cooling steam 134 into the LPT cooling air 124. Any suitable flow control valve may be used as the HPT cooling steam control valve 136 or the LPT cooling steam control valve 138. Such flow control valves may have a closed position and a plurality of open positions including a fully open position. The flow control valves may be electrically operable valves, hydraulically operable valves, or pneumatically operable valves. When the flow control valves are hydraulically operable, the hydraulic fluid may be suitable fluids of the turbine engine 10 including, for example, the fuel 67, lubrication oil, and the like.

FIG. 3 is a partial cross-sectional elevational view of a hot gas path engine component and, more specifically, a core hot gas path component 200. The core hot gas path component 200 shown in FIG. 3 is a turbine blade 202 such as of the HPT rotor blades 70 or one of the LPT rotor blades 74 (see FIG. 1). The turbine blade is used by way of example, and the following discussion thus also applies to other core hot gas path components 200. The turbine blade 202 includes a dovetail 210 and an airfoil 220. The airfoil 220 extends from a tip 222 to a root 224. The dovetail 210 further includes a platform 212, integral with the airfoil 220 at the root 224, which helps to radially contain the turbine air flow. The dovetail 210 can be configured to mount to a turbine rotor disk on the engine 10 (see FIG. 1). The dovetail 210 comprises at least one inlet cooling passage 214, (three are shown in FIG. 3) extending through the dovetail 210 to provide internal fluid communication with the airfoil 220 at a cooling passage outlet 216. For clarity, the dovetail 210 is shown in cross section, such that the inlet cooling passages 214 are housed within the body of the dovetail 210. Cooling air, such as the HPT cooling air 122 when the turbine blade 202 is an HPT rotor blade 70 or the LPT cooling air 124 when the turbine blade 202 is an LPT rotor blades 74, flows through the inlet cooling passages 214 and into the airfoil 220 to cool the airfoil 220.

Figure 4:
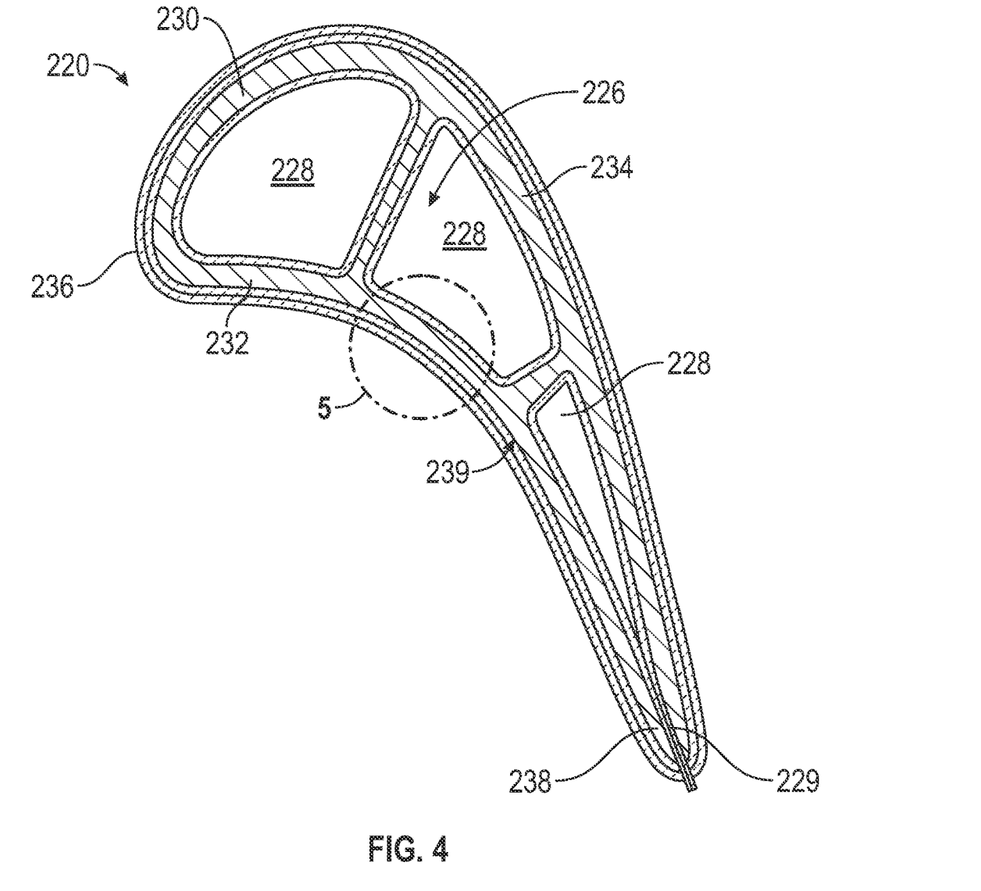
FIG. 4 is a cross-sectional view of the turbine blade shown in FIG. 3, taken along line 4-4 in FIG. 3.

FIG. 4 is a cross-sectional view of the airfoil 220 of the turbine blade 202, taken along line 4-4 in FIG. 3. The airfoil 220 includes a wall 230 defining an interior 226. The wall 230, more specifically, includes a concave-shaped pressure sidewall 232, defining a pressure side, and a convex-shaped suction sidewall 234, defining a suction side, which are joined together to define the airfoil shape with a leading edge 236 and a trailing edge 238. The airfoil 220 rotates in a direction such that the pressure sidewall 232 follows the suction sidewall 234. Thus, as shown in FIG. 4, the airfoil 220 would rotate upward toward the top of the page.

Within the interior 226 of the airfoil 220, the airfoil 220 includes a plurality of internal passages that may be arranged to form cooling circuits dedicated to cool a particular portion of the airfoil 220. The cooling circuits can be defined by one or more passages extending radially within the airfoil 220. These passages are referred to herein as cooling passages 228 or cooling conduits, and the airfoil 220, more specifically, the interior 226 of the airfoil 220, includes one or more cooling passages 228. The respective geometries of each individual passage within the airfoil 220 can have different arrangements to cool particular portions of the airfoil 220 including various additional flow paths and geometries not explicitly depicted in FIG. 4. The cooling passages 228 may include one or more cooling or film holes 229, which can provide fluid communication between the particular cooling passages 228 and an external surface 239 of the airfoil 220. In FIG. 4, the cooling holes 229 are depicted as being formed in the trailing edge 238, but the cooling holes 229 may be formed on other locations of the airfoil such as the pressure sidewall 232 or the suction sidewall 234, providing a film of cooling fluid along the external surface 239 of the airfoil 220.

As illustrated, the airfoil 220 is provided with three cooling circuits, including a leading edge cooling circuit, a mid-cooling circuit, and a trailing edge cooling circuit. The cooling passages 228 of each cooling circuit are fluidly connected to one of the inlet cooling passages 214 to receive a cooling fluid via the inlet cooling passages 214. The cooling fluid may be any suitable cooling fluid, but, in the embodiments discussed herein, the cooling fluid is the HPT cooling air 122, which, as discussed above with respect to FIG. 2, may be mixed with the HPT cooling steam 132.

Figure 5:
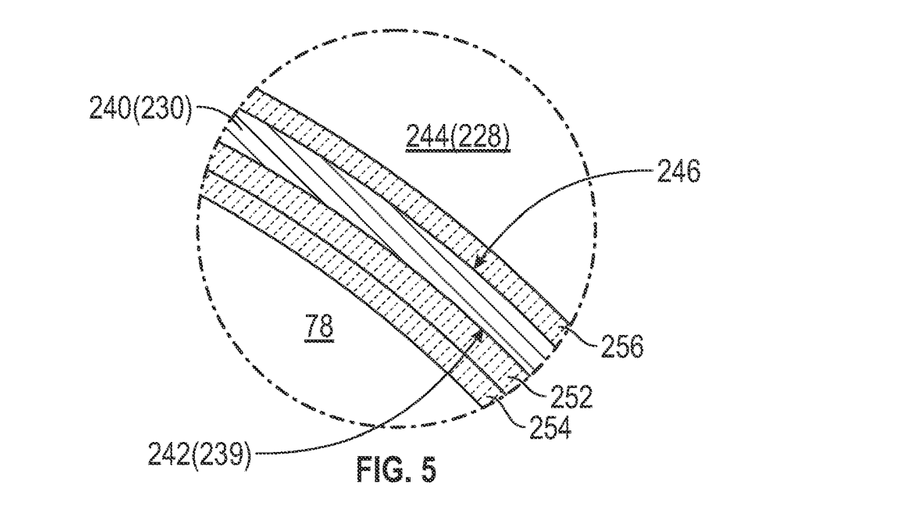
FIG. 5 is a detail view of the turbine blade shown in FIG. 4, showing detail 5 of FIG. 4.

FIG. 5 is a detail view of the turbine blade shown in FIG. 4, showing detail 5 of FIG. 4. As noted above, the turbine blade 202 is provided by way of an example of a core hot gas path component 200. The discussion of the turbine blade 202, particularly the following discussion, thus also applies to other core hot gas path components 200. The core hot gas path component 200 (turbine blade 202) includes a substrate 240. The substrate 240 may be a wall, such as the wall 230 of the turbine blade 202. The substrate 240 may be formed from a metal, and thus may be a metallic substrate. Metals suitable for use as the substrate in the core hot gas path components 200 discussed herein include high temperature metals and metal alloys such as, for example, stainless steel, corrosion-resistant alloys of nickel and chromium, and high-strength nickel-base alloys. The substrate 240 may thus be formed from a metal alloy chosen from the group consisting of iron-based alloys, nickel-based alloys, including nickel-based superalloys, and chromium-based alloys. In some embodiments, cobalt-based alloys and titanium-based alloys may also be used. Additionally, the substrate may be formed from nonmetallic materials including ceramic matric composites.

As used herein, the term "ceramic matrix composite" ("CMC") refers to a subgroup of composite materials and a subgroup of ceramics. The terms "CMC" and "CMC material" are used interchangeably herein. When the engine component (e.g., the higher pressure turbine module, nozzle, or blades thereof) comprises or includes "CMC" or "CMC material," the engine component may include one of, or combinations of one or more of the ceramic matrix composite materials described herein. Such engine component may also include non-ceramic matrix composite materials, such as a metal alloy (e.g., a CMC material for an airfoil and a separate disk with a dovetail slot made from a metal alloy). Reference to a "first" or a "second" or a "third" CMC material does not preclude the materials from including multiple CMC materials, different CMC materials, or the same CMC materials.

More specifically, CMC refers to a class of materials that includes a reinforcing material (e.g., reinforcing fibers) in a ceramic matrix. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration ("MI") with silicon, or a cure or pyrolysis to yield a silicon carbide matrix in the preform, and subsequent chemical vapor infiltration ("CVI") with silicon carbide. Additional steps may be taken to improve densification of the preform, either before or after chemical vapor infiltration, by injecting the preform with a liquid resin or polymer followed by a thermal processing step to fill the voids with silicon carbide. CMC material as used herein may be formed using any known methods or hereafter developed including but not limited to melt infiltration, chemical vapor infiltration, polymer impregnation pyrolysis (PIP) and any combination thereof.

Such materials, along with certain monolithic ceramics (i.e., ceramic materials without a reinforcing material), are particularly suitable for higher temperature applications. Additionally, these ceramic materials are lightweight compared to metal alloys (e.g., superalloys), yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

As discussed above, the core hot gas path component 200 is located in the hot gas path 78 (e.g., the HPT stator vanes 68, the HPT rotor blades 70, the LPT stator vanes 72, and the LPT rotor blades 74) or defines the hot gas path 78 (e.g., combustion liner, shrouds, and frames) through which the combustion gases 66 flow (see FIG. 1). The core hot gas path component 200 and, more specifically, the substrate 240 thus includes a combustion-gas-facing surface 242. The combustion-gas-facing surface 242 of the substrate 240 is the surface of the substrate facing the hot gas path 78 through which the combustion gases 66 flow. In the example of the turbine blade 202, the combustion-gas-facing surface 242 is the external surface 239 of the wall 230. As used herein, the term "facing surface" when used in conjunction with other modifiers is used to identify the position of one surface of a component, substrate, layer, and the like relative to other surfaces of the same component, substrate, layer, and the like. Such surfaces are not necessarily directly exposed to the fluid, for example, which they face. For example, as will be discussed below, the combustion-gas-facing surface 242 of the substrate 240 is not directly exposed to the combustion gases 66 as one or more coating are formed thereon.

To protect the core hot gas path component 200 and, more specifically, the substrate 240, a thermal barrier coating (TBC) 252 may be applied to the combustion-gas-facing surface 242. Preferably, the TBC 252 is a coating with a high thermal resistivity, such as ceramic materials, that protects the substrate 240 from the heat of the combustion gases 66 within the hot gas path 78. The ceramic may be a stabilized ceramic that can sustain a fairly high temperature gradient such that the coated metallic components can be operated at gas temperatures higher than the melting point of the metal. For instance, the TBC material may be one or more of yttria stabilized zirconia (YSZ) and other rare-earth-stabilized zirconia compositions, mullite ($3Al_2O_3 \cdot 2SiO_2$), alumina ($Al_2O_3$), ceria ($CeO_2$), rare-earth zirconates (e.g., $La_2Zr_2O_7$), rare-earth oxides (e.g., $La_2O_3$, $Nb_2O_5$, $Pr_2O_3$, $CeO_2$), and metal-glass composites, including combinations thereof (e.g., alumina and YSZ, or ceria and YSZ). One particularly suitable TBC material is, for example, yttria-stabilized zirconia (YSZ).

To provide the desired thermal resistance, the TBC 252 preferably is a coating that is structured and applied to the substrate 240 to have a relatively high level of porosity, enhancing the thermal resistance of the TBC 252. The TBC 252 may thus be a ceramic layer having a porosity in the range from about ten (10) percent to about twenty-five (25) percent. The TBC 252 may be applied to the substrate 240 using a suitable coating process such as, for example, chemical vapor deposition, thermal spray techniques, or physical vapor deposition techniques. Thermal spray techniques and physical vapor deposition techniques may be preferred as such techniques may produce coatings having relatively high levels of porosity (such as the preferred ranges, discussed above) as compared to other coating techniques like chemical vapor deposition. The TBC 252 may be applied as a single layer, but the TBC 252 may include two or more layers of the ceramic coating. For example, two layers of YSZ may be formed by plasma spray or two layers of different ceramic materials may be formed. One or more intermediate coatings (not shown) may be applied between the TBC 252 and the substrate 240. Such intermediate coatings include bond coatings, such as MCrAlY-based coatings (where M is Ni, Co, or a mixture of Ni and Co), used to achieve desired levels of adhesion between the substrate 240 and the TBC 252, depending on the nature of the materials involved and the selected methods for processing the materials.

As noted above in FIG. 2, the turbine engine 10 includes a steam system 100 for extracting additional work from the combustion gases 66 that would otherwise be exhausted. The steam 178 may be injected into the core air flow path 33, such as into the combustor 26. Accordingly, the core hot gas path components 200 are not only exposed to the high temperatures of the combustion gases 66 but also to water within the combustion gases 66. Such water exposure is particularly acute when supercritical hydrogen or gaseous hydrogen is used as the fuel 67, as a combustion product is water. Accordingly, the core hot gas path components 200 discussed herein also include a hydrophobic coating 254 applied to the combustion-gas-facing surface 242 to help to protect the core hot gas path component 200 and, more specifically, the substrate 240 from corrosion or ice ice-buildup on the surface of the core hot gas path component 200 when the turbine engine 10 is in a shut-down condition. For clarity herein, this hydrophobic coating 254 is referred to as an exterior hydrophobic coating 254.

The "liquid wettability," or "wettability," of a solid surface may be determined by observing the nature of the interaction occurring between the solid surface and a drop of a given liquid disposed on the surface. A high degree of wetting results in a relatively low solid-liquid contact angle and large areas of liquid-solid contact. Conversely, a low degree of wetting results in a relatively high solid-liquid contact angle with the liquid forming droplets on the surface. The degrees of wettability discussed herein are discussed relative to the interaction of water to surfaces of the core hot gas path components 200 and, more specifically, the exterior coatings, such as the exterior hydrophobic coating 254 formed on the combustion-gas-facing surface 242. As described herein, these coatings are hydrophobic and, thus, the coatings preferably have relatively low water wettability with a contact angle at or above ninety (90) degrees. The exterior hydrophobic coating 254 may also be a superhydrophobic coating having a contact angle greater than one hundred twenty (120) degrees.

As noted above, the exterior hydrophobic coating 254 will be exposed to relatively high temperatures in the core hot gas path components 200 discussed herein. The materials used to form the exterior hydrophobic coating 254 are, thus, preferably stable at these temperatures and do not thermally deteriorate. Many traditional hydrophobic materials are polymers, such as tetrafluoroethylene, silanes, waxes, polyethylene, and propylene, but such polymers are not suitable for these high temperature ranges. The exterior hydrophobic coating 254 discussed herein may be formed from a ceramic material having sufficient hydrophobicity, such as a contact angle of eighty (80) degrees or greater and, more preferably, ninety (90) degrees or greater.

Suitable ceramic materials that may be used as the exterior hydrophobic coating 254 include, for example, the ceramic coatings or "oxide materials" described in U.S. Pat. No. 7,977,267, the entirety of which is incorporated by reference herein. Both ytterbium (III) oxide and europium (III) oxide, which are $A_2O_3$-type oxides, have been found to promote dropwise condensation and to be intrinsically hydrophobic. Moreover, combinations (such as solid solutions) of these two oxides also were shown to have this same remarkable combination of properties. The exterior hydrophobic coating 254, thus, may be formed of an oxide material containing one or more of ytterbia ($Yb_2O_3$) and europia ($Eu_2O_3$). The oxides may further contain other additives, such as oxides of gadolinium (Gd), samarium (Sm), dysprosium (Dy), or terbium (Tb). The oxide may further comprise lanthanum (La), praseodymium (Pr), or neodymium (Nd) in addition to the ytterbia and/or europia. As noted above, the exterior hydrophobic coating 254 may be formed from a mixed ytterbium-europium oxide. The mixed ytterbium-europium oxide may have a formula of $(Yb_xEu_{1-x})_2O_3$, wherein x is in a range from about 0.01 to about 0.99. Such a material may comprise a B-type monoclinic oxide comprising ytterbia and europia, where up to about twenty-five (25) atom percent of the total cations present in the oxide are tetravalent cations. In some embodiments, this B-type oxide further comprises an additional material such as Sm, Dy, or Tb, and, in particular embodiments, this additional material is up to about fifty (50) mole percent of the oxide.

In one embodiment, the exterior hydrophobic coating 254 may be formed from an oxide comprising from about sixty (60) mole percent to about ninety-five (95) mole percent gadolinia and at least about one (1) mole percent ytterbia or europia. In this embodiment, the oxide is B-type monoclinic, and less than about twenty-five (25) atomic percent of the total cations present in the oxide are tetravalent. In some embodiments, the oxide comprises up to about thirty (30) mole percent ytterbia, and, in certain embodiments, the oxide concurrently comprises at least about seventy (70) mole percent gadolinia. In other embodiments, the oxide comprises up to about twenty-five (25) mole percent europia, and may concurrently comprise at least about seventy-five (75) mole percent gadolinia. These embodiments may include "binary" oxides, in which the oxide consists essentially of gadolinia and either ytterbia or europia but not both. In other embodiments, the oxide comprises both ytterbia and europia in addition to the gadolinia. In certain embodiments, the total amount of ytterbia plus europia present in the oxide is below about forty (40) mole percent, which provides an oxide that has shown particularly desirable wettability and condensation characteristics.

The exterior hydrophobic coating 254 may be formed from certain compositions based on europia. In one embodiment, the exterior hydrophobic coating 254 includes an oxide comprising at least about fifty (50) mole percent europia and further comprising samaria, terbia, or dysprosia. Less than about twenty-five (25) atomic percent of the total cations present in the oxide are tetravalent. In certain embodiments, the oxide is B-type monoclinic.

The exterior hydrophobic coating 254 also may be formed from an oxide having a composition defined by the chemical formula $(A_xB_{1-x})_2O_3$. Here, A comprises Yb or Eu, and B comprises Gd, Sm, Dy, or Tb, and x is in a range from about 0.01 to about 0.99. In particular embodiments, less than about twenty-five (25) atomic percent of the total cations present in the oxide are tetravalent. Generally, these materials have exhibited surprisingly desirable wettability and condensation properties, but certain compositions are typically less desirable because poor behavior is observed or expected. For instance, when A is essentially Yb (i.e., the Eu content is very close to zero save for incidental impurity levels), only material having B consisting essentially of Gd is expected to show the desired properties. In some embodiments, x is up to about 0.3. Similarly, when A is essentially Eu, levels of Sm, Dy, and/or Tb as denoted by x in the above formula in a range from about 0.5 to about 0.99 may result in desirable properties. Certain combinations of cations in the this $(A_xB_{1-x})_2O_3$ material have shown or are expected to show particularly attractive wettability and condensation behavior and, thus, the exterior hydrophobic coating 254 may be formed from the following oxides. In one example, A comprises Eu, such as when A comprises Eu and B comprises Gd. In a particular embodiment, A comprises Eu and B comprises Gd, and x is in a range from about 0.01 to about 0.4. Another particular range of interest in this system is when x is in a range from about 0.7 to about 0.9, when contact angle of about one hundred (100) degrees was also observed. When A comprises both Eu and Yb, B, in some embodiments, comprises Gd. In particular embodiments of this type, x is in a range from about 0.01 to about 0.3. Alternatively, x may be in a range from about 0.5 to about 0.99.

Based on the forgoing, the exterior hydrophobic coating 254 may be formed from an oxide generally comprising at least about twenty (20) mole percent of a first oxide that is ytterbia, europia, or a combination of these, and a second oxide that is an oxide of La, Pr, or Nd. In certain embodiments, the oxide material is defined by the chemical formula $((A)_xB_{1-x})_2O_3$, where A is Yb, Eu, or combinations thereof, and B is La, Pr, or Nd. In some embodiments, when B is La or Pr, x is in a range from greater than 0.5 to about 0.99. In other embodiments, when B is Nd, x is in a range from about 0.2 to about 0.99. In addition, any of the oxide compositions discussed above may be present in the exterior hydrophobic coating 254 at a level of at least about fifty percent (50%) by volume, and, more preferably, the exterior hydrophobic coating 254 may consists essentially of the oxide.

In addition to the materials used to form the exterior hydrophobic coating 254, the desired hydrophobicity may be achieved by surface texturing or in conjunction with the application method of the exterior hydrophobic coating 254.

The core hot gas path component 200 and, more specifically, the substrate 240, includes a plurality of layers formed on the combustion-gas-facing surface 242 including each of the TBC 252 and the exterior hydrophobic coating 254. With the TBC 252 providing thermal protection and the exterior hydrophobic coating 254 providing protection from the contact of water within the combustion gases 66, the exterior hydrophobic coating 254 is preferably applied as the outermost layer on the combustion-gas-facing surface 242. The TBC 252 is thus an intermediate coating layer arranged and applied to the combustion-gas-facing surface 242 between the exterior hydrophobic coating 254 and the substrate 240.

Various suitable methods may be used to apply the exterior hydrophobic coating 254 to the combustion-gas-facing surface 242 and, in the embodiment shown in FIG. 5, to the TBC 252. Such methods may depend on the material used for the exterior hydrophobic coating 254, but, in the embodiments discussed herein, when the exterior hydrophobic coating 254 is a ceramic applied to the TBC 252, the exterior hydrophobic coating 254 may be applied by chemical vapor deposition or physical vapor deposition processes.

The core hot gas path component 200 may also include at least one cooling passage 244 formed therein, such as, for example, the cooling passages 228 of the turbine blade 202, discussed above. This cooling passage 244 may be an internal cooling passage formed on the interior of the core hot gas path component 200 to cool the core hot gas path component 200 when a cooling fluid flows therethrough. In embodiments discussed herein, the cooling fluid may be a cooling air having water vapor (or steam) mixed therein, such as HPT cooling air 122. The core hot gas path component 200 and, more specifically, the substrate 240 in this embodiment, thus, includes a cooling-passage-facing surface 246. The combustion-gas-facing surface 242 is the surface facing cooling passage 244, and, in some embodiments, defining the cooling passage 244.

With the water vapor flowing through the cooling passage 244, the core hot gas path components 200 discussed herein also include a hydrophobic coating 256 applied to the cooling-passage-facing surface 246 to help protect the core hot gas path component 200 and, more specifically, the substrate 240 from corrosion or ice-building up within the cooling passage 244 when the turbine engine 10 is in a shut-down condition. For clarity herein, this hydrophobic coating 256 is referred to as an interior hydrophobic coating 256. Even within the cooling passage 244, the interior hydrophobic coating 256 may be exposed to high temperatures and thus the hydrophobic coatings discussed above for the exterior hydrophobic coating 254 may also be used for the interior hydrophobic coating 256. As the cooling-passage-facing surface 246 is not facing the combustion gases 66, the cooling-passage-facing surface 246 does not include a TBC 252 as an intermediate layer between the interior hydrophobic coating 256 and the substrate 240.

In the forgoing discussion, the turbine blade 202 is provided as an example of the core hot gas path component 200. The hydrophobic coatings discussed herein, particularly, the exterior hydrophobic coating 254 may also be used on components of the steam turbine 110 that contact the flow path of the steam 176, 178 (see FIG. 2). Thus the discussion of the turbine blade 202 may also apply to the turbine blades of the steam turbine 110. In the steam turbine 110, however, the temperatures may not be as high as in the HPT 28 and the LPT 30. Accordingly, the TBC 252 and/or the internal cooling circuits described above may be omitted when the turbine blade 202 is a turbine blade of the steam turbine 110.

The turbine engine 10 discussed herein includes a steam system 100 which that is used to produce steam 176, 178. In addition to producing extra work from waste heat from the combustion gases 66 that would otherwise be exhausted, the steam 176, 178 may be used in various ways, such as by being injected into the combustor 26 or used within cooling fluids, such as the HPT cooling air 122 and the LPT cooling air 124. The core hot gas path components 200 discussed herein may thus define or be positioned within fluid passages containing a fluid with water vapor. In the embodiments discussed herein, a hydrophobic coating (e.g., exterior hydrophobic coating 254 or interior hydrophobic coating 256) is applied to surfaces of the core hot gas path component 200. Further aspects of the present disclosure are provided by the subject matter of the following clauses.

A turbine engine for an aircraft. The turbine engine includes a core turbine engine and a steam system. The core turbine engine includes a core air flow path for core air to flow therethrough, a combustor, a hot gas path, and a core hot gas path component fluidly connected to the hot gas path. The combustor is located in the core air flow path to receive compressed air and fluidly coupled to a fuel source to receive fuel. The fuel is injected into the combustor to mix with the compressed air to generate a fuel and air mixture. The fuel and air mixture is combusted in the combustor to generate combustion gases. The hot gas path routes the combustion gases through the turbine engine, and the hot gas path is a portion of the core air flow path. The core hot gas path component includes a substrate having a combustion-gas-facing surface facing the hot gas path. The steam system extracts water from the combustion gases, vaporizes the water to generate steam, and injects the steam into the core air flow path to add mass flow to the core air. The core hot gas path component includes a hydrophobic coating formed on the combustion-gas-facing surface, reducing wetting of water vapor within the combustion gases on the core hot gas path component.

A turbine engine for an aircraft. The turbine engine includes a core turbine engine and a steam system. The core turbine engine includes a core air flow path for core air to flow therethrough, a high-pressure compressor, a combustor, a hot gas path, and a high-pressure turbine. The high-pressure compressor is located in the core air flow to compress air. The high-pressure compressor has 10, 11, or 12 stages and compression ratio greater than 20:1. The combustor is located in the core air flow path to receive the compressed air and fluidly coupled to a fuel source to receive fuel. The fuel is injected into the combustor to mix with the compressed air to generate a fuel and air mixture.

The fuel and air mixture is combusted in the combustor to generate combustion gases. The hot gas path routes the combustion gases through the turbine engine. The hot gas path is a portion of the core air flow path. The high-pressure turbine is fluidly connected to the hot gas path to receive the combustion gases and to cause the high pressure-turbine to rotate. The high-pressure turbine is coupled to the high-pressure compressor to rotate high-pressure compressor when the high pressure-turbine rotates. The high-pressure turbine is a single stage including at least one turbine airfoil. The steam system extracts water from the combustion gases, vaporizes the water to generate steam, and injects the steam into the core air flow path to add mass flow to the core air. The at least one turbine airfoil has a combustion-gas-facing surface and a hydrophobic coating formed on the combustion-gas-facing surface, reducing wetting of water vapor within the combustion gases on the core hot gas path component.

The turbine engine of any preceding clause, wherein the hydrophobic coating, including the exterior hydrophobic coating and/or the interior hydrophobic coating, is formed from an oxide.

The turbine engine of the preceding clause, wherein the oxide has a composition defined by the chemical formula $(A_xB_{1-x})_2O_3$, wherein A comprises Yb or Eu, and B comprises Gd, Sm, Dy, or Tb, and x is in a range from about 0.01 to about 0.99, subject to the following: provided that, (i) when A consists essentially of Yb, B consists essentially of Gd and (ii) when A consists essentially of Eu and B comprises Sm, Dy, or Tb, x is in a range from about 0.5 to about 0.99.

The turbine engine of the preceding clause, wherein the oxide has a composition defined by the chemical formula $(A_xB_{1-x})_2O_3$, wherein A comprises Yb and Eu, and B comprises Gd, Sm, Dy, or Tb, and x is in a range from about 0.01 to about 0.99.

The turbine engine of any preceding clause, wherein A comprises Eu.

The turbine engine of any preceding clause, wherein A comprises Eu and Yb.

The turbine engine of any preceding clause, wherein B comprises Gd.

The turbine engine of any preceding clause, wherein B consists essentially of Gd.

The turbine engine of any preceding clause, wherein x is in a range from about 0.01 to about 0.3.

The turbine engine of any preceding clause, wherein x is in a range from about 0.01 to about 0.4.

The turbine engine of any preceding clause, wherein x is in a range from about 0.7 to about 0.9.

The turbine engine of any preceding clause, wherein x is in a range from about 0.01 to about 0.3.

The turbine engine of any preceding clause, wherein x is in a range from about 0.5 to about 0.99.

The turbine engine of any preceding clause, wherein the oxide comprises from about sixty (60) mole percent to about ninety-nine (99) mole percent gadolinia and at least about one (1) mole percent ytterbia.

The turbine engine of any preceding clause, wherein the oxide comprises up to about thirty (30) mole percent ytterbia.

The turbine engine of any preceding clause, wherein the oxide comprises at least about seventy (70) mole percent gadolinia.

The turbine engine of any preceding clause, wherein the oxide further comprises europia.

The turbine engine of any preceding clause, wherein the oxide further comprises samaria, dysprosia, or terbia.

The turbine engine of any preceding clause, wherein the oxide comprises x mole percent of ytterbia and 100-x mole percent of gadolinia, wherein x is up to about thirty (30) mole percent.

The turbine engine of any preceding clause, wherein the oxide comprises at least about fifty (50) mole percent europia, and comprises at least one of samaria, terbia, or dysprosia.

The turbine engine of any preceding clause, wherein the oxide is B-type monoclinic.

The turbine engine of any preceding clause, wherein the oxide has up to about twenty-five (25) atomic percent of its total cation content as tetravalent cations.

The turbine engine of any preceding clause, wherein the oxide is present in the hydrophobic coating at a level of at least about fifty percent (50%) by volume.

The turbine engine of any preceding clause, wherein the hydrophobic coating consists essentially of the oxide.

The turbine engine of any preceding clause, wherein the core hot gas path component further includes a thermal barrier coating applied to the combustion-gas-facing surface.

The turbine engine of any preceding clause, wherein the thermal barrier coating is an intermediate coating layer arranged and applied to the combustion-gas-facing surface between the hydrophobic coating and the substrate.

The turbine engine of any preceding clause, further comprising a turbine located in the hot gas path downstream of the combustor to receive the combustion gases and to rotate the turbine, the core hot gas path component being a component of the turbine.

The turbine engine of any preceding clause, further comprising a core shaft, the turbine being drivingly coupled to the core shaft to rotate the core shaft when the turbine rotates.

The turbine engine of any preceding clause, wherein the turbine includes a plurality of turbine blades, the core hot gas path component being at least one of turbine blade of the plurality of turbine blades.

The turbine engine of any preceding clause, wherein the turbine is a low-pressure turbine.

The turbine engine of any preceding clause, wherein the turbine is a high-pressure turbine.

The turbine engine of any preceding clause, wherein the at least one turbine blade includes an airfoil having an external surface, the external surface of the airfoil being the combustion-gas-facing surface and the hydrophobic coating being an exterior hydrophobic coating.

The turbine engine of any preceding clause, wherein the at least one turbine blade includes a cooling passage formed on an interior of the airfoil, a cooling-passage-facing surface facing the cooling passage, and an interior hydrophobic coating formed on the cooling-passage-facing surface.

The turbine engine of any preceding clause, wherein the cooling passage is fluidly coupled to a cooling air source to receive cooling air, the cooling air including steam from the steam system.

The turbine engine of any preceding clause, wherein the combustor is fluidly coupled to the steam system to receive steam the steam being injected into the combustor.

The turbine engine of any preceding clause, further comprising a boiler located downstream of the combustor, the boiler receiving water and being fluidly connected to the combustor to receive the combustion gases and to boil the water to generate steam.

The turbine engine of any preceding clause, further comprising a core shaft, a turbine located in the hot gas path downstream of the combustor, and a steam turbine. The turbine located in the hot gas path downstream of the combustor receives the combustion gases and causes the turbine to rotate. The turbine is coupled to the core shaft to rotate the core shaft when the turbine rotates. The steam turbine is fluidly coupled to the boiler to receive the steam from the boiler and to cause the steam turbine to rotate, the steam turbine being coupled to the core shaft to rotate the core shaft when the steam turbine rotates.

The turbine engine of any preceding clause, wherein the core shaft is a low-pressure shaft and the turbine is a low-pressure turbine.

The turbine engine of any preceding clause, further comprising a fan including a plurality of blades and a fan shaft, the fan shaft being coupled to the low-pressure shaft to be driven by the low-pressure shaft.

The turbine engine of any preceding clause, further comprising a bypass airflow passage and a condenser. A first portion of air flowing into the fan flows through a bypass airflow passage as bypass air and a second portion of the air flowing into the fan flows through the core air flow path as core air. The condenser is positioned downstream of the boiler and in the bypass airflow passage for bypass air to cool the combustion gases and to condense the water from the combustion gases.

The turbine engine of any preceding clause, further comprising a condenser located downstream of the boiler to condense water from the combustion gases and to generate an exhaust-water mixture.

The turbine engine of the preceding clause, further comprising a water separator located downstream of the condenser, the water separator separating the water from the exhaust-water mixture and the water separator fluidly connected to the boiler to provide the water to the boiler.

The turbine engine of the preceding clause, wherein the water separator is a cyclonic separator.

The turbine engine of any preceding clause, wherein the boiler is fluidly coupled to the water separator.

The turbine engine of any preceding clause, further comprising a water pump in fluid communication with the water separator and with the boiler to direct the flow of water from the water separator into the boiler.

The turbine engine of any preceding clause, further comprising a high-pressure shaft, a high-pressure turbine, and a high-pressure compressor. The high-pressure turbine is positioned downstream of the combustor to receive the combustion gases and to cause the high-pressure turbine to rotate. The high-pressure turbine is coupled to the high-pressure shaft to rotate the high-pressure shaft when the high-pressure turbine rotates. The high-pressure compressor is positioned in the core air flow path upstream of the combustor and downstream of the low-pressure compressor. The high-pressure compressor is driven by the high-pressure shaft to compress the core air flowing through the core air flow path and to generate the compressed air.

A turbine blade comprising an airfoil having an interior. A cooling passage is formed on the interior for cooling air to flow therethrough, and a cooling-passage-facing surface facing the cooling passage. A hydrophobic coating is formed on the cooling-passage-facing surface, reducing wetting of water vapor within the cooling air on the turbine blade.

The turbine blade of the preceding clause, wherein the hydrophobic coating is an interior hydrophobic coating, and wherein the airfoil has an external surface and exterior hydrophobic coating formed on the external surface.

A turbine engine comprising a turbine that includes a plurality of the turbine blades each of the plurality of the turbine blades being the turbine blade of any turbine blade of the preceding clauses.

The turbine engine of the preceding clause, wherein the cooling passage is fluidly coupled to a cooling air source to receive the cooling air.

The turbine engine of any preceding clause, wherein the cooling air that includes steam from a steam source.

The turbine engine of the preceding clause, wherein the steam source is the steam system.

The turbine engine of any preceding clause, comprising a turbine including a plurality of turbine blades, the turbine blades of the plurality of turbine blades being the turbine blade of any preceding clause.

The turbine engine of any preceding clause, wherein the core turbine engine further includes a compressor that compresses core air to generate compressed air. The compressor being the cooling air source.

The turbine engine of any preceding clause, further comprising a turbine including a core shaft. The combustor and the turbine define a portion of the core air flow path.

The turbine engine of any preceding clause, wherein the compressor is coupled to the core shaft to be rotated by the core shaft.

The turbine engine of any preceding clause, wherein the turbine is a high-pressure turbine, the core shaft is a high-pressure shaft, and the compressor is a high-pressure turbine.

The turbine engine of the preceding clause, further comprising a fan and a nacelle, and a steam system. The fan including a plurality of fan blades that rotates to generate a volume of air. The fan is drivingly coupled to the core shaft such that rotation of the turbine causes the fan to rotate. The nacelle circumferentially surrounds the fan. The nacelle defines a bypass airflow passage between the nacelle and the core turbine engine. The volume of air from the fan is split and flows into the bypass airflow passage as bypass air and flows into the core air flow path as the core air.

The turbine engine of the preceding clause, wherein a bypass ratio of the bypass air to the core air is greater than 18:1.

The turbine engine of any preceding clause, wherein the bypass ratio is in a range of 18:1 to 100:1.

The turbine engine of any preceding clause, wherein the bypass ratio is in a range of 25:1 to 85:1.

The turbine engine of any preceding clause, wherein the bypass ratio is in a range of 28:1 to 70:1.

The turbine engine of any preceding clause, wherein the core turbine engine further includes a compressor that compresses the core air to generate the compressed air. The compressor is drivingly coupled to the core shaft and defines a portion of the core air flow path.

The turbine engine of the preceding clause, wherein the compressor includes a high-pressure compressor and includes a compression ratio greater than 20:1.

The turbine engine of the preceding clause, wherein the plurality of stages of the compressor includes ten to twelve stages.

The turbine engine of any preceding clause, wherein the turbine includes a high-pressure turbine (HPT) and includes only one stage of HPT rotor blades and HPT stator vanes.

The turbine engine of any preceding clause, further comprising a low-pressure turbine.

The turbine engine of the preceding clause, wherein the low-pressure turbine has a low-pressure shaft coupled to the fan.

The turbine engine of any preceding clause, further comprising a low-pressure compressor coupled to the low-pressure shaft to be driven by the low-pressure turbine and the steam turbine.

The turbine engine of any preceding clause, the low-pressure turbine having a pressure expansion ratio in a range of 4.5:1 to 28:1.

The turbine engine of any preceding clause, the high-pressure turbine having a pressure expansion ratio in a range of 1.5:1 to 4:1.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A turbine engine for an aircraft, the turbine engine comprising:
an engine core including:
a core air flow path for core air to flow therethrough;
a combustor located in the core air flow path to receive compressed air and fluidly coupled to a fuel source to receive fuel, the fuel being injected into the combustor to mix with the compressed air to generate a fuel and air mixture, the fuel and air mixture being combusted in the combustor to generate combustion gases;
a hot gas path routing the combustion gases through the turbine engine, the hot gas path being a portion of the core air flow path;
a turbine located in the hot gas path downstream of the combustor to receive the combustion gases and to cause the turbine to rotate, the turbine including a plurality of turbine blades, at least one turbine blade of the plurality of turbine blades having:
an airfoil with an external surface that is a combustion-gas-facing surface, an exterior hydrophobic coating formed on the external surface to reduce wetting of water vapor within the combustion gases on the at least one turbine blade;
a cooling passage formed on an interior of the airfoil for cooling air to flow therethrough;
a cooling-passage-facing surface facing the cooling passage; and
an interior hydrophobic coating formed on the cooling-passage-facing surface to reduce wetting of water vapor within the cooling air on the at least one turbine blade; and
a steam system including:
a condenser located downstream of the combustor to condense water from the combustion gases and to generate an exhaust-water mixture; and
a boiler fluidly coupled to the condenser to receive the water from the exhaust-water mixture and boil the water to generate steam,
wherein the core air flow path is fluidly coupled to the boiler for the steam to be injected into the core air flow path to add mass flow to the core air.

2. The turbine engine of claim 1, wherein the interior hydrophobic coating is formed from an oxide, wherein up to 25 atomic percent of a total cation content of the oxide is tetravalent cations, the oxide having a composition defined by the chemical formula $(A_xB_{1-x})_2O_3$, wherein A comprises Yb or Eu, and B comprises Gd, Sm, Dy, or Tb, and wherein x is in a range from about 0.01 to about 0.99, subject to the following:
provided that, (i) when A consists essentially of Yb, B consists essentially of Gd and (ii), when A consists essentially of Eu and B comprises Sm, Dy, or Tb, x is in a range from about 0.5 to about 0.99.

3. The turbine engine of claim 1, wherein the interior hydrophobic coating is formed from an oxide, the oxide comprises from 60 mole percent to 99 mole percent gadolinia and at least 1 mole percent ytterbia, wherein the oxide is B-type monoclinic and up to 25 atomic percent of a total cation content of the oxide is tetravalent cations.

4. The turbine engine of claim 1, wherein the interior hydrophobic coating is formed from an oxide that comprises at least 50 mole percent europia, and comprises at least one of samaria, terbia, or dysprosia, wherein up to 25 atomic percent of a total cation content of the oxide is tetravalent cations.

5. The turbine engine of claim 1, wherein the airfoil further includes a thermal barrier coating applied to the external surface.

6. The turbine engine of claim 5, wherein the thermal barrier coating is an intermediate coating layer arranged and applied to the airfoil between the exterior hydrophobic coating and the external surface.

7. The turbine engine of claim 1, further comprising a core shaft, the turbine being coupled to the core shaft to rotate the core shaft when the turbine rotates.

8. The turbine engine of claim 1, wherein the cooling passage is fluidly coupled to a cooling air source to receive the cooling air, the cooling air including steam from the steam system.

9. The turbine engine of claim 8, wherein the engine core further includes a compressor that compresses core air to generate compressed air, the compressor being the cooling air source.

10. The turbine engine of claim 1, wherein the boiler is located downstream of the combustor and fluidly connected to the combustor to receive the combustion gases to boil the water to generate the steam.

11. The turbine engine of claim 10, further comprising:
a core shaft, the turbine being coupled to the core shaft to rotate the core shaft when the turbine rotates; and
a steam turbine fluidly coupled to the boiler to receive the steam from the boiler and to cause the steam turbine to rotate, the steam turbine being coupled to the core shaft to rotate the core shaft when the steam turbine rotates.

12. The turbine engine of claim 11, wherein the core shaft is a low-pressure shaft and the turbine is a low-pressure turbine.

13. The turbine engine of claim 1, further comprising a water separator located downstream of the condenser, the water separator configured to separate the water from the exhaust-water mixture and the water separator fluidly connected to the boiler to provide the water to the boiler.

14. A turbine engine for an aircraft, the turbine engine comprising:
an engine core including:
a core air flow path for core air to flow therethrough;
a high-pressure compressor located in the core air flow path to compress air, the high-pressure compressor having 10, 11, or 12 stages and a compression ratio greater than or equal to 20:1 and less than or equal to 40:1;
a combustor located in the core air flow path to receive the compressed air and fluidly coupled to a fuel source to receive fuel, the fuel being injected into the combustor to mix with the compressed air to generate a fuel and air mixture, the fuel and air mixture being combusted in the combustor to generate combustion gases;

a hot gas path routing the combustion gases through the turbine engine, the hot gas path being a portion of the core air flow path; and a high-pressure turbine fluidly connected to the hot gas path to receive the combustion gases and to cause the high-pressure turbine to rotate, the high-pressure turbine being coupled to the high-pressure compressor to rotate the high-pressure compressor when the high-pressure turbine rotates, the high-pressure turbine being a single stage including at least one turbine airfoil; and a steam system including:
- a condenser located downstream of the combustor to condense water from the combustion gases and to generate an exhaust-water mixture; and
- a boiler fluidly coupled to the condenser to receive the water from the exhaust-water mixture and boil the water to generate steam, wherein the core air flow path is fluidly coupled to the boiler for the steam to be injected into the core air flow path to add mass flow to the core air, wherein the at least one turbine airfoil has a combustion-gas-facing surface and a hydrophobic coating formed on the combustion-gas-facing surface to reduce wetting of water vapor within the combustion gases on the at least one turbine airfoil, and wherein the at least one turbine airfoil includes:
- a cooling passage formed on an interior of the at least one turbine airfoil for cooling air to flow therethrough;
- a cooling-passage-facing surface facing the cooling passage; and
- an interior hydrophobic coating formed on the cooling-passage-facing surface to reduce wetting of water vapor within the cooling air on the at least one turbine airfoil.

15. The turbine engine of claim 14, wherein the at least one turbine airfoil further includes a thermal barrier coating applied to the combustion-gas-facing surface, the thermal barrier coating being an intermediate coating layer arranged and applied to the combustion-gas-facing surface between the hydrophobic coating and a substrate of the at least one turbine airfoil.

16. The turbine engine of claim 14, wherein the cooling passage is fluidly coupled to a cooling source to receive the cooling air, the cooling air including steam from the steam system.

17. The turbine engine of claim 14, wherein the compression ratio is greater than 24:1 and less than or equal to 40:1.

18. The turbine engine of claim 14, further comprising a water separator located downstream of the condenser, the water separator configured to separate the water from the exhaust-water mixture and the water separator fluidly connected to the boiler to provide the water to the boiler.

* * * * *